July 3, 1962 S. J. HARTWELL 3,041,997
MAXIMUM AND MINIMUM INDICATOR
Filed Jan. 11, 1960 2 Sheets-Sheet 1

Inventor
Sidney J. Hartwell
By Houston L. Swenson
Attorney

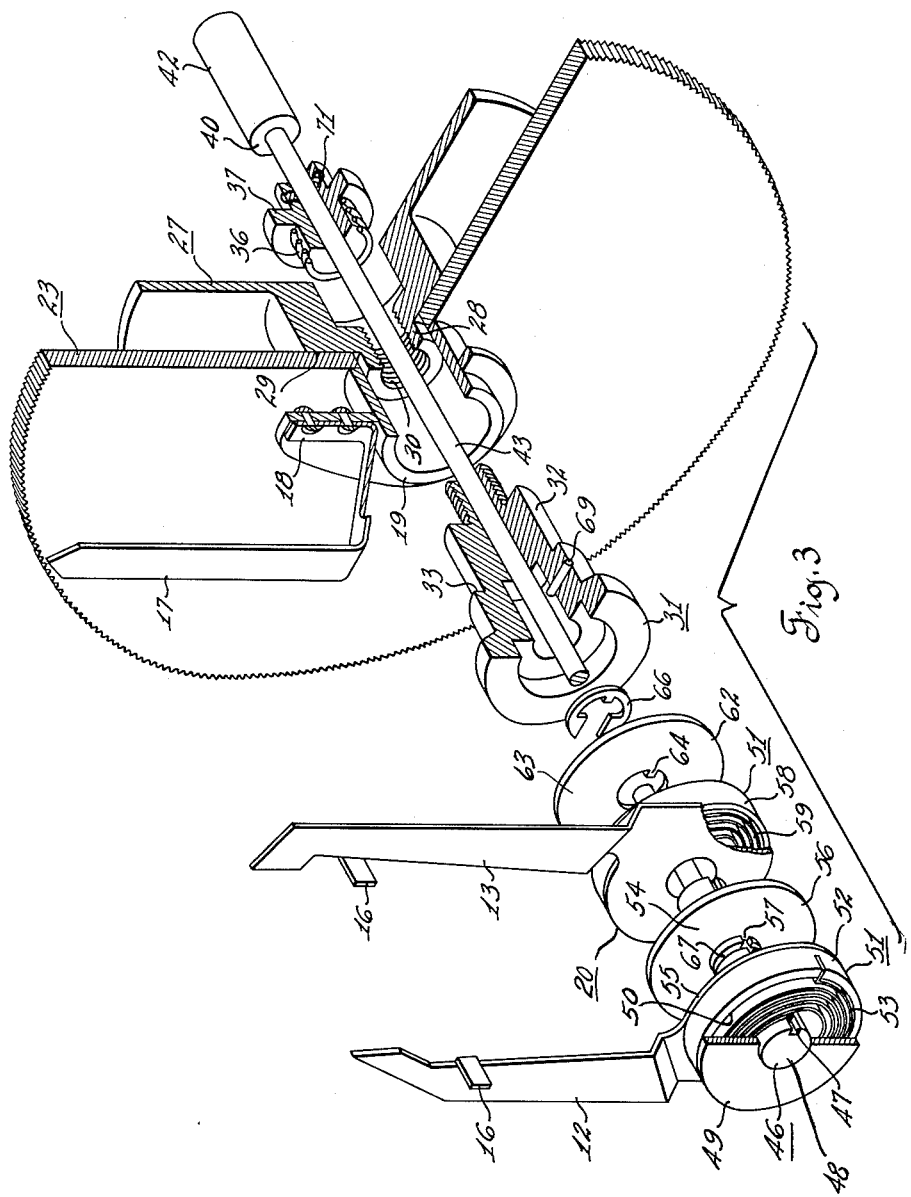

United States Patent Office 3,041,997
Patented July 3, 1962

3,041,997
MAXIMUM AND MINIMUM INDICATOR
Sidney J. Hartwell, Wauwatosa, Wis., assignor to Allis-Chalmers Manufacturing Company, Milwaukee, Wis.
Filed Jan. 11, 1960, Ser. No. 1,756
7 Claims. (Cl. 116—129)

This invention relates to a reset mechanism for an indicating instrument having maximum and minimum indicating members.

There are a number of instances where it is desirable to periodically determine the maximum and minimum readings for an indicating member such as in thermometers, and accelerometers. The period for recording the maximum and minimum readings may be as short as a day or possibly as long as several weeks. In any case, it is necessary to provide the indicating instrument with a reset mechanism which returns the maximum and minimum pointers to their initial position after their readings are recorded.

The indicating instrument of this invention is particularly suitable for positioning in confined spaces and at elevated positions inasmuch as its reset mechanism is a compact unit which can be operated with no difficulty. In accordance with this invention an indicating instrument is provided with spring biased pointers mounted on opposite sides of an instantaneous member for engagement therewith. The pointers are held against their biasing means by clutch assemblies which are engaged by a compression spring. The resulting structure is a relatively inexpensive and compact unit which may be readily reset by momentarily relieving the clutch assemblies of the force from the spring.

It is therefore one object of this invention to provide a new and improved indicating instrument which can be more easily reset.

A further object of this invention is to provide a new and improved indicating instrument in which the reset mechanism is a compact unit.

Figure 2:
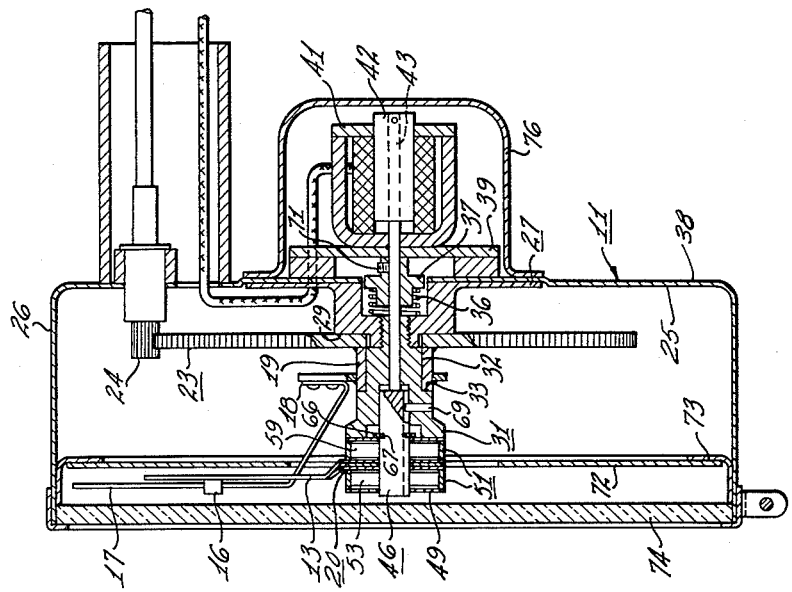
Figure 1:
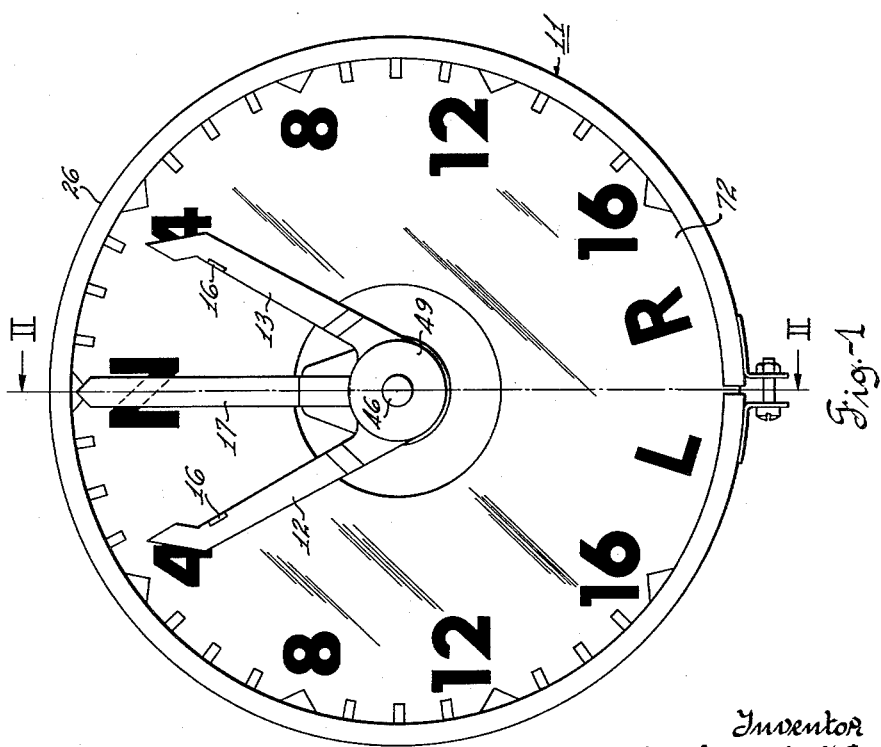

Other objects and advantages of the present invention will be apparent from the following description when read in connection with the accompanying drawings in which:

FIG. 1 is a front view of the indicating instrument;
FIG. 2 is a sectional view of the indicating unit taken along lines II—II of FIG. 1;
FIG. 3 is an exploded and partial cutaway view of the reset mechanism.

The Invention

A preferable form of the invention is illustrated in FIG. 1 and comprises an indicating instrument 11 to be used for indicating maximum and minimum positions. The indicator 11 has a pair of pointers 12 and 13 which indicate respectively the minimum and maximum positions in which a tap changer operates at over a predetermined period. Each of the pointers 12 and 13 has a tab 16 which is engageable with an instantaneous pointer 17. Thus, whenever instantaneous pointer 17 travels past its previous maximum or minimum readings it will move an indicating pointer 12 or 13. In FIGS. 2 and 3 instantaneous member 17 is shown with a bracket 18 which is fixed to a flanged section 19 of a geared disk 23. Disk 23 is driven by a rotatable driving shaft 24 which is responsive to a quantity being measured. Shaft 24 is journaled in instrument housing 26 which contains the reset mechanism 20 and the indicating members 12, 13 and 17.

Mounted flush with the interior back 25 of housing 26 is a spring retaining member 27. As more clearly seen in FIG. 3, retaining member 27 is an annular cylindrical member with an extending hollow collar 28. Face 29 of device 27 restricts axial movement of disk 23 in one direction. Collar 28 is interiorly threaded 30 and an annular shaft support 31 is threadedly engaged with the collar 28. Support 31 has a bearing surface 32 on which the flange 19 of disk 23 is free to rotate. Shoulder 33 abuts flange 19 to further restrict axial movement of the disk. Mounted within spring retaining device 27 is a spiral spring 36 which is maintained in compression therein by an annular back plate 37. Mounted on the exterior back 38 of housing 26 is an annular support member 39 (see FIG. 2). Support member 39 is in an abutting relationship with member 37 for limiting its axial movement and also serves as a mounting platform for a solenoid 41. Secured at one end 40 to plunger 42 of the solenoid is a nonrotatable shaft 43 on which support member 39, back plate 37 and shaft support 31 are slidably mounted. Fixedly secured on the opposite end of shaft 43 is a cylindrical member 46 having a slot 47. A thin circular capping disk 49 is securely mounted to the extending end 48 of member 46.

Journaled for rotation on member 46 are a pair of clutch assemblies 51 to which pointers 12, 13 are coupled (see FIG. 3). A cylindrical receptacle element 52 forms one plate 55 of a clutch assembly and supports pointer 12. Positioned within receptacle 52 is a spring 53 coiled about member 46. Spring 53 is maintained in a biased condition by means of its ends which are interlocked in the wall 50 of receptacle element 52 and the slot 47 of member 46. Plate 55 of element 52 is flat and serves as the engaging surface for one of the clutch assemblies 51, with the other plate 54 of the clutch assembly being a flat, thin, annular disk 56. Disk 56 has a keyed portion 57 which slidably engages slot 47 of member 46 to absolutely prevent rotation thereon. In a similar manner, the other indicating pointer 13 has a receptacle element 58 mounted on member 46 for rotation thereon. A spring 59 for biasing pointer 13 is mounted within receptacle element 58 similarly to spring 53. The back of pointer 13 likewise serves as a clutch plate for the second clutch assembly with a second annular thin disk 62 identical to disk 56 providing the other plate 63 for this second clutch assembly. A lock washer 66 is mounted on member 46 in engagement with groove 67 to maintain the clutch assemblies on member 46.

Method of Assembly

In assembling the indicating instrument, the two clutch assemblies with their springs are mounted on cylindrical member 46 flush to the capping disk 49. The clutch assemblies are secured by placing lock washer 66 on the cylindrical member 46. Next, shaft support 31 is mounted on the shaft and is secured thereto with a set screw 69 which engages slot 47 of member 46, thereby preventing rotation of the shaft. The geared disk 23 and instantaneous pointer 17 are mounted over the shaft support with the flanged section 19 in abutment with shoulder 33. Spring retaining device 27 is threaded onto shaft support 31 and spring 36 is inserted in the cavity of the retaining device. Back plate 37 is inserted over the shaft to place spring 36 under a predetermined amount of compression. A set screw 71 fixes back plate 37 to the shaft. A circular plate 72 with a flange ring 73 and bearing the desired arrangement of numbers is inserted about and behind the pointers. Housing 26 is inserted over the assembled unit onto flange 73 and support member 39 is mounted on the exterior back of the housing. A cover 74 of a transparent material is mounted over the front of housing 26. Solenoid 41 and plunger 42 are mounted on the right hand end of shaft 43 and an enclosure 76 is placed over the solenoid onto the back of housing 26. The assembled unit may now be mounted on a driving shaft 24.

Method of Operation

In operation as driving shaft 24 rotates, geared disk 23 in turn rotates causing movement of instantaneous pointer 17. The tabs 16 engage either a maximum or minimum pointer to drive the pointer against its biasing spring 53, or as the case may be, 59. The maximum and minimum indicating members are maintained in the position which the instantaneous pointer leaves them by means of the clutch assemblies 51. Since the clutch engaging spiral spring 36 is mounted in compression, it exerts a force against back plate 37 causing the shaft 43 to push the clutch assemblies against shaft support 31 by means of capping disk 49. Inasmuch as the surfaces of annular disks 56 and 62 and cylindrical receptacle elements 52 and 58 which comprise the pairs of clutch plates for the clutch assemblies have a high coefficient of friction, the receptacle elements to which the indicating members are mounted are kept from returning to their initial positions. In the preferred embodiment the clutch plates comprise relatively flat surfaces of brass composition. Thus, although the springs 53 and 59 are attempting to return the indicating members 12 and 13 to engagement with instantaneous pointer 17, this is prevented by the clutch assemblies. Disks 56 and 62 do not rotate inasmuch as they are fixed to shaft 43 by keyed portions 57 and 64. Therefore, as long as these disks are in a tight compressive relationship with the other elements of the clutch assemblies, receptacle elements 52 and 58 and pointers 12 and 13 are held against the biasing action of springs 53 and 59. However, the coefficient of friction between the clutch plates is not of such a magnitude as to prevent them from slipping when pointers 12 and 13 are pushed by instantaneous pointer 17.

To restore the maximum and minimum indicating members to instantaneous pointer 17, shaft 43 is momentarily depressed toward the cover 74 of the indicating instrument. By so doing, capping disk 49 is taken out of contact with receptacle element 52. The separation of these two members causes the force normally transmitted from the compressed spring 36 to the shaft and disk 49 to be removed from the clutch assemblies, thereby disengaging the clutch plates. Upon disengagement of the clutch assemblies, springs 53 and 59, which are biased, cause the indicating members to snap back to member 17. Shaft 43 is returned to its initial position as shown in FIG. 2 by means of spring 36 which strives to seek an uncompressed condition. In this manner, capping disk 49 once again transmits a compressing force against the clutch assemblies 51 to cause them to become engaged for further operation. As shown in FIG. 2, the means for depressing shaft 43 comprises a solenoid 41. While this is generally a preferable arrangement, it is understood that shaft 43 could be depressed manually by means of a knob attached to the end of the shaft.

Although only one embodiment of this invention has been illustrated and described, it will be apparent to those skilled in the the art that various changes and modifications may be made therein without departing from the spirit of the invention or the scope of the appended claims.

What is claimed is:

1. An indicating member comprising: a hollow shaft support; a nonrotatable shaft mounted through said hollow shaft support in an axial slidable relation thereto; a pair of adjacent clutch assemblies mounted in sliding relation on one end of said shaft, each of said assemblies having a plate with a pointer and being rotatably mounted on said shaft; an instantaneous indicator rotatably mounted on said shaft; an instantaneous indicator rotatably mounted about a point on said shaft spaced from said assemblies and between each said pointer for engagement with a tab on each said pointer; resilient means connected to each of said assemblies to urge each said pointer toward said indicator; a member fixed to said shaft and adjacent to said clutch assemblies; and a biasing means coupled to said shaft and urging said member against said clutch assemblies.

2. An indicating member comprising: a hollow shaft support; a nonrotatable shaft mounted through said hollow shaft support in an axial slidable relation thereto; a pair of adjacent clutch assemblies mounted in sliding relation on one end of said shaft, each of said assemblies having a plate engageable with each other and supporting a pointer, each said plate being rotatably mounted on said shaft; an instantaneous indicator rotatably mounted about said shaft support at a point spaced from said assemblies and between each said pointer for engagement with a tab on each said pointer; resilient means coupling each said plate and said shaft for urging each said pointer toward said indicator; a member fixed to said shaft end adjacent to said clutch assemblies; a resilient biasing element coupled to said shaft and urging said member against said clutch assemblies; and a means associated with said shaft for selectively moving said shaft fixed member away from said clutch assemblies to oppose the urging action of said biasing element whereby each said plate is disengaged.

3. An indicating member comprising: a hollow shaft support; a nonrotatable shaft mounted through said hollow shaft support in an axial slidable relation thereto; a pair of adjacent clutch assemblies mounted in an axial slidable relation on one end of said shaft, each of said assemblies having a first plate with a pointer and being rotatably mounted on said shaft; each of said assemblies having a second plate contiguous to said first plate and mounted on said shaft with relative movement therebetween limited to axial motion; an instantaneous indicator rotatably mounted about said shaft at a point spaced from said assemblies and between each said pointer for engagement with a tab on each said pointer; resilient means coupled to each said first plate to urge each said pointer toward said indicator; a member fixed to said shaft end adjacent to said clutch assemblies; and a biasing means coupled to said shaft and urging said member against said clutch assemblies.

4. An indicating member comprising: a hollow shaft support; a nonrotatable shaft mounted through said hollow shaft support in an axial slidable relation thereto; a pair of adjacent clutch assemblies mounted in an axial slidable relation on one end of said shaft, each said assembly having a contiguous first and second plate, each said first plate having a pointer and being mounted on said shaft with relative movement therebetween limited to axial motion; an instantaneous indicator rotatably mounted about said shaft support at a point spaced from said assemblies and between each said pointer for engagement with a tab on each said pointer; biased resilient means coupled to each said first plate to urge each said pointer toward said indicator; a member fixed to said shaft adjacent to said clutch assemblies; and a biased resilient means coupled to said shaft and urging said member against said clutch assemblies.

5. An indicating member comprising: a hollow shaft support; a nonrotatable shaft mounted through said hollow shaft support in an axial slidable relation thereto; a pair of adjacent clutch assemblies mounted in an axial slidable relation on one end of said shaft, each of said assemblies having a contiguous first and second plate, each said first plate having a pointer and being rotatably mounted on said shaft, each said second plate being mounted on said shaft with relative movement therebetween limited to axial motion; an instantaneous indicator rotatably mounted about said shaft support at a point spaced from said assemblies and between each said pointer for engagement with a tab on each said pointer; biased coil spring means mounted about said shaft and coupled to each said first plate to urge each said pointer toward said indicator; a member fixed to said shaft end adjacent to said clutch assemblies; and an axially biased spiral spring coupled to said shaft and urging said member against said clutch assemblies.

6. An indicating member comprising: a hollow shaft support; a nonrotatable shaft mounted through said hollow shaft support in an axial slidable relation thereto; a pair of adjacent clutch assemblies slidably mounted on one end of said shaft, each of said assemblies having a first plate with a pointer and being rotatably mounted on said shaft, each of said clutch assemblies having a second plate contiguous to said first plate and mounted on said shaft with relative movement therebetween limited to axial motion; an instantaneous indicator rotatably mounted about said shaft support at a point spaced from said assemblies and between each said pointer for engagement with a tab on each said pointer; resilient means coupling each said first clutch plate and said shaft to urge each said pointer toward said indicator; a member fixed to said shaft end adjacent to said clutch assemblies; a resilient biasing element coupled to said shaft and urging said member against said clutch assemblies; and a means associated with said shaft for selectively moving said shaft fixed member away from said clutch assemblies to oppose the urging action of said biasing element whereby each said plate is disengaged.

7. An indicating member comprising: a hollow shaft support; a nonrotatable shaft slidably mounted through said hollow shaft support in an axial slidable relation thereto; a pair of adjacent clutch assemblies mounted in an axial slidable relation on one end of said shaft, each of said assemblies having a contigous first and second plate, said first plate comprising a receptacle element having a pointer and rotatably mounted on said shaft, said second plate comprising a disk, each said disk mounted on said shaft with relative movement therewith limited to axial motion; an instantaneous indicator rotatably mounted about said shaft support at a point spaced from said assemblies and between each said pointer for engagement with a tab on each said pointer; coil spring means positioned within said receptacle elements about said shaft and attached therebetween to urge each said pointer toward said indicator; a member fixed to one end of said shaft adjacent to said clutch assemblies; a spring retaining element mounted about said shaft and fixed to said shaft support; a spiral spring mounted around said shaft and against said retaining element urging said member against said clutch assemblies; and a means associated with said shaft for selectively moving said shaft fixed member away from said clutch assemblies to oppose the urging action of said spiral spring whereby each said plate is disengaged.

References Cited in the file of this patent
UNITED STATES PATENTS

| | | |
|---|---|---|
| 1,407,987 | Crane | Feb. 28, 1922 |
| 2,110,391 | Davis | Mar. 8, 1938 |
| 2,433,541 | Bevins | Dec. 30, 1947 |
| 2,605,736 | Cook | Aug. 5, 1952 |

UNITED STATES PATENT OFFICE
CERTIFICATE OF CORRECTION

Patent No. 3,041,997                                            July 3, 1962

Sidney J. Hartwell

It is hereby certified that error appears in the above numbered patent requiring correction and that the said Letters Patent should read as corrected below.

Column 3, lines 68 and 69, strike out "an instantaneous indicator rotatably mounted on said shaft;".

Signed and sealed this 23rd day of October 1962.

(SEAL)
Attest:

ERNEST W. SWIDER                              DAVID L. LADD
Attesting Officer                                  Commissioner of Patents